Figure 1:
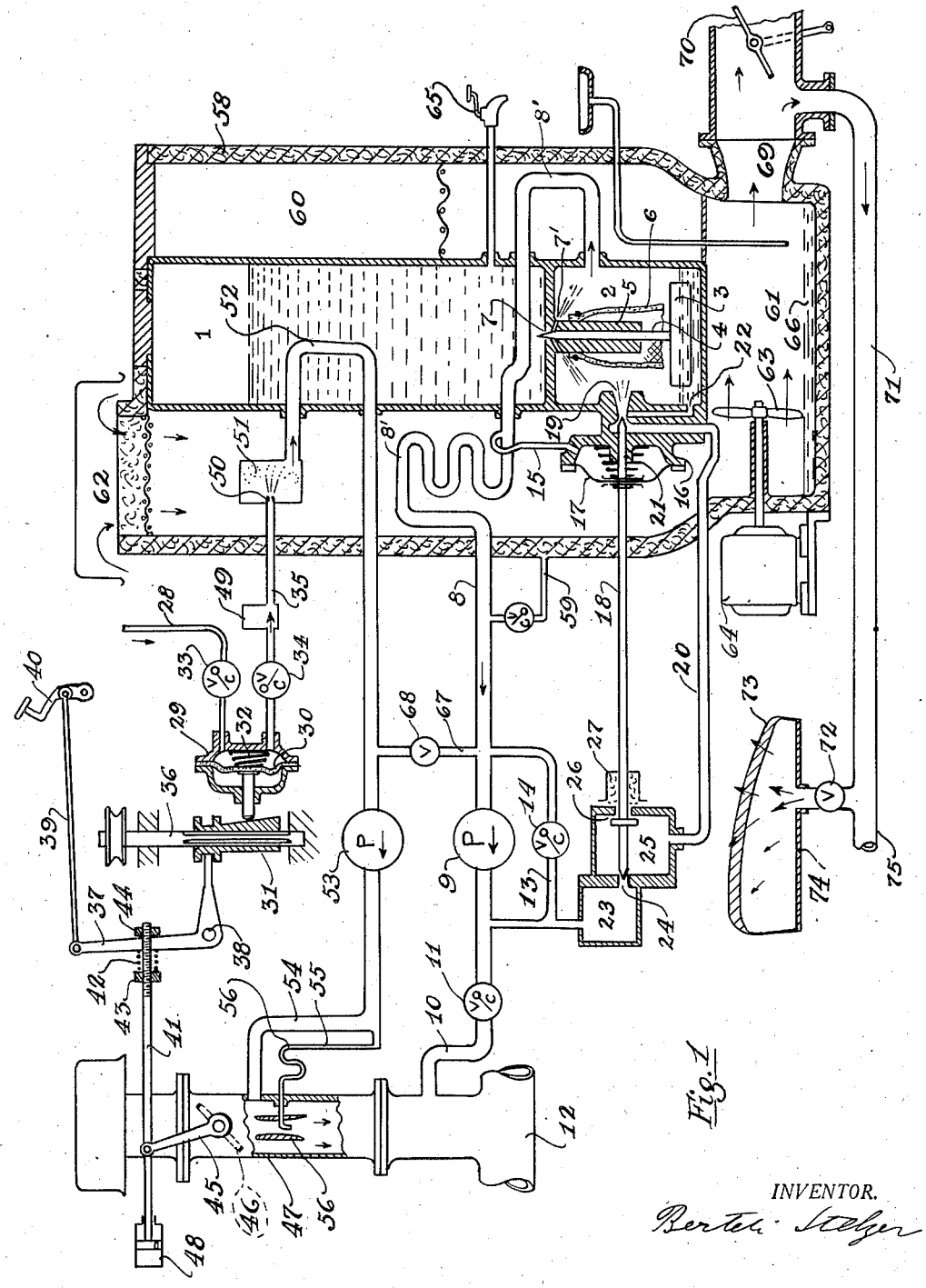

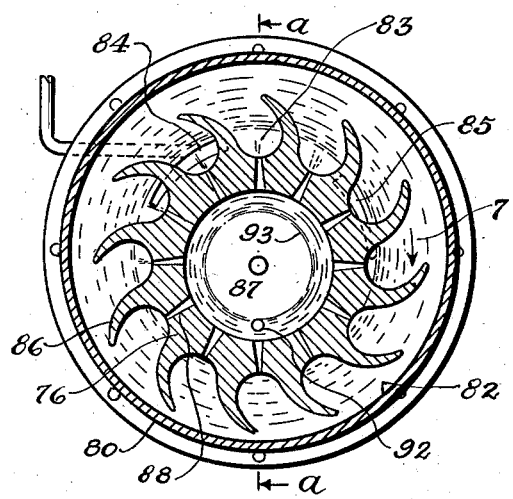
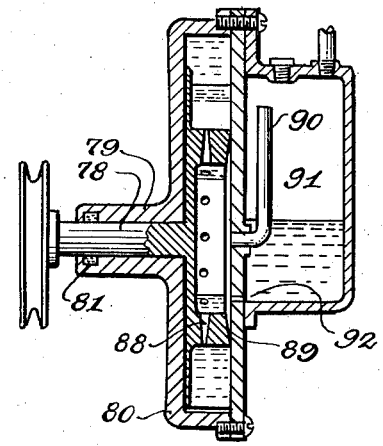

Patented Nov. 15, 1938

2,136,527

UNITED STATES PATENT OFFICE 2,136,527

REFRIGERATING AND AIR-CONDITIONING SYSTEM IN CONJUNCTION WITH INTERNAL COMBUSTION ENGINES

Berteli Stelzer, South Bend, Ind.

Application December 21, 1935, Serial No. 55,625

13 Claims. (Cl. 62—169)

The invention relates to a refrigerating and air-conditioning system utilizing the manifold vacuum of an internal combustion engine to help evaporate water and fuel to produce a cooling effect, and where the vapors formed are fed into the engine.

The object is to provide partial cooling economically by inexpensive equipment and at the same time to improve engine performance by feeding water vapor into the intake manifold to permit a lean fuel setting without the danger of overheating.

Another object is to provide a vacuum pump which itself has considerable novelty whose discharge side is connected to the intake manifold of the engine, thus producing a very high vacuum.

A further object is to admit air into the vacuum line when the vacuum in the manifold drops, whereby the air passing through a venturi, atomizing water, carries away vapors formed by surface evaporation. This feature is of importance because it tends to keep refrigeration constant regardless of engine speed.

The invention also aims at using the cooling obtained from evaporation of the engine fuel, and to provide a device using ordinary gasoline consisting of fuels of different volatility by forcibly feeding a measured amount of fuel to the carburetor or "mixer," the lighter parts in gaseous form, the heavier as a liquid.

Since almost an absolute vacuum is required to cool water vapor to 32 degrees Fahrenheit, and .0125 at. to reach 50 degrees Fahrenheit, it is not the aim to reach the freezing point, but to work near the latter temperature. For air-conditioning, drinking water and keeping food fresh such a temperature is satisfactory.

Lower temperatures, however, may be reached by the evaporation of the fuel, depending on its volatility. Thus if little refrigeratory is required, and the refrigerating device is well insulated from heat, the evaporation of the lightest parts of the fuel may maintain a temperature considerably lower than that of the water.

Other advantages will appear on the accompanying drawings wherein:

Fig. 1 is a diagram of a system embodying the invention;

Fig. 2, a diagrammatic view of the improved vacuum pump with the cover removed;

Fig. 3, a section taken on line a—a;

Fig. 4, a modification of said vacuum pump;

Fig. 5, a view of a modified form of vacuum pump;

Fig. 6, a sectional view thereof the section through the housing being taken on line b—b;

Fig. 7, a diagram illustrating the principle of said pump;

Fig. 8, a modified pump used as shock-absorber.

Referring now to Fig. 1, there is shown a reservoir 1 to contain water under atmospheric pressure. Below is a float chamber or generator 2 containing water held at a fixed height by means of float valve 3 consisting of a float and a needle 4 sliding in a bearing 5 carrying a wick 6 and admitting water from the reservoir 1 to chamber 2 through orifices 7 and 7' when the water level in the latter has fallen. A suction pipe 8 forming coils 8' and passing through the water reservoir 1 leads to a vacuum pump 9 shown in detail in Figs. 2 and 3. However, any type of vacuum pump may be used, especially those of the turbo-compressor type. A pipe line 10 having a check valve 11 interposed leads from said pump to the intake manifold 12 of the engine. A bypass 13 with a check valve 14 allows direct flow of steam from line 8 to the manifold should the suction in line 10 be greater than in line 8. Another line 15 communicating with the suction line 8 leads to a diaphragm housing 16 to operate a diaphragm 17 carrying a needle 18 adapted to seat against the opening of a venturi 19 forming communication between the atmospheric passage 20 and vacuum chamber 2. A spring 21 tends to hold the venturi open, and is overcome when the suction in the manifold has increased. A small passage 22 leads from the narrowest part of the venturi below the water level, so that when air is admitted through 19 water is sucked up and atomized. To drain condensed water back to the generator, I provide a sump 23 to receive condensed water from lines 10 and 13, an orifice 24 held open by the extended needle 18 when the venturi 19 is closed communicates with a reservoir 25 from which leads the atmospheric line 20. A valve 26 held open with venturi 19 admits air into said reservoir through an air-cleaner 27.

I shall now describe the construction used to evaporate the fuel and the method of feeding it in its new form to the carburetor. To convey the fuel from the fuel tank (not shown) to which leads a fuel pipe 28 I use a metering pump 29 of the diaphragm type having a diaphragm 30 held against an eccentric 31 by a spring 32. Check valves 33, 34 are placed in the suction line 28 and discharge line 35, respectively. The eccentric 31 is splined to a shaft 36 driven in any manner by the engine. Rotation causes oscillation of said diaphragm, the magnitude of which may be varied by shifting said eccentric by a bell crank 37 pivoted at 38 and being operated by the operator by means of the accelerator rod 39 leading to the accelerator pedal 40. Another rod 41 attached to the bell crank by means of a pick-up arrangement consisting of a spring 42 and an adjustable collar 43 and 44, is connected to the throttle lever 45 carrying the throttle 46 of the carburetor 47. A damper 48 of any conventional design retards the action of said throttle.

The fuel discharged into the line 35 which has an air dome 49 is sucked through an orifice or nozzle 50 into a chamber 51 to atomize, and through a coil 52 by the suction of a pump 53 which then delivers the fuel partly in vapor, partly in liquid form to the carburetor by means of pipes 54 and 55. While the vapors will pass through the former, the latter will carry the liquid fuel to be atomized in a small venturi 56. A syphon 57 serves to store a reserve, which helps in starting the engine.

The refrigerator enclosure 58 consists of a porous insulating material with an air-tight skin around it. A vacuum line 59 leads thereto so that the enclosure is evacuated, thus improving the insulation. A compartment 60 serves for storing food. Another compartment 61 serves as an air convector for air-conditioning. The air to be cooled is forced through the air cleaner 62 past the cool coils by an induced draft fan 63 driven by an electric motor 64. The waste water from the faucet or drinking fountain 65 drips into the sump 66 which serves to further clean and cool the passing air. The two systems are connected by a line 67 and valve 68, whereby a single pump may serve the two systems. The convector 61 has an outlet at 69, where the main air duct of the air-conditioning system is connected. I provide a throttle or valve 70 to controllably direct an amount of air through a duct 71 and valve 72 to a seat 73 having an air-tight bottom 74, so that the cool air is forced through the fabric of the seat to improve riding comfort. The amount of draft or filtration may be controlled individually for each seat by said valve 72. The duct continues at 75 to the next seat, which is a repetition of the one already shown.

Describing now pump 9, shown more in detail in Figs. 2 and 3, there is shown an impeller 76 turning in the direction indicated by the arrow 77 by means of a drive shaft 78 suitably driven by the engine. Said shaft turns in the hub 79 of the housing 80, with an oil seal 81 preventing leakage. The hub 79 is eccentric to the periphery 82 of the pump chamber. The latter is partly filled with oil or some other fluid with low boiling temperature, which, when rotated by the impeller 76, by centrifugal force follows the housing, leaving empty pockets 83 which come into communication first with an intake or suction port 84 and then with discharge or exhaust port 85. The pump so far described is old and well-known, but to produce a very high vacuum, such as is needed to boil water near freezing temperature, it becomes necessary to provide some means by which all water or water vapor is completely discharged, because any residue of water between the vanes 86 of the impeller would expand in the pockets or cells 83 and thereby reduce the vacuum. To accomplish the end, some novel means have been incorporated by which the cells 83 are flushed with oil. For this purpose the impeller, which has an inner hollow chamber 87 to receive oil or vapor, has taper holes 88 widening towards the inside. These holes offer a greater resistance to the flow of a fluid outwardly than they do inwardly. This is well-known to those versed in the art as the loss due to changing pressure into velocity is very small, where as, vice versa, it is considerable. The angle of the taper should not exceed 10 degrees as otherwise the widening hole would give no benefit in changing velocity into pressure when the fluid flows inwardly. To further decrease the resistance to the flow from the outer chamber to the inner chamber 87 and to increase it from the inner chamber to the outer, I increase the clearance between impeller and pump housing at 89 towards the inside or pump chamber 87. This has the same effect as the holes 88, and is very cheap in construction. Thus the holes 88 may be obviated by this tapering clearance, except where a pump is constructed very wide. The inner chamber 87 connects through a tube 90, serving as vapor discharge, with a reservoir 91. A hole 92 maintains a certain oil level 93 in chamber 87 while the pump is running. The vapors are allowed to escape into the discharge pipe 10. Considering the pump in operation, and the oil circulating, then at 93 the oil begins to break away from the impeller, forming a vacuum. At the same time oil flows through the hole 88 by the latent pressure in chamber 87. But as the resistance in this direction is great, the flow is very small. As soon as the cell registers with the intake or suction port 84 vapor from the line 9 is admitted to the cell. When the latter starts to decrease again, those vapors are compressed until they are allowed to escape through the exhaust port 85 into reservoir 91. Now as the oil stream is larger than when it started to break off because of the leak through the holes 88, the excess amount of oil is forced through said holes 88 and clearance 89, now flowing fast and efficiently, pushing air or vapor before it, which as soon as it reaches chamber 87 rises to the surface and escapes through tube 90 into the discharge line. The pump, by its inherent friction, maintains a rather high temperature, which helps to prevent any condensed water in the pump. It has been found that ordinary paraffin oil is most satisfactory because of its low boiling point and good lubricating qualities. But other fluids may be used, especially those of higher specific gravity.

In Fig. 4 a modified form is shown, employing the same principle. The housing 94 is of elliptical shape, the impeller 97 being in the center. In this construction the housing periphery deviates twice from that of the impeller during one revolution, therefore, two suction ports 95 and two discharge ports 96 are required.

A further modification, also based on the principle of using the inertia of an accelerated fluid to create a vacuum, is shown in Figs. 5 and 6. The pump shown is used in conjunction with a supply or source of a flowing fluid, as for instance the oil pressure line of an internal combustion engine. It may even be applied to the ordinary house water system to produce a low pressure.

Though this device may be called a vacuum pump, it is rather a converter or motor than a pump, because it is not mechanically driven, but is impelled like a turbine by the circulating fluid. The principle is to let a fluid flow through a passage, then suddenly shutting off the supply, whereby the fluid in motion continues due to the inertia of its mass and creates a vacuum, the passage then coming into communication with a suction port to pump gases from a suction line. A rotor or runner 98 having radial vanes 99 and trunnions or shaft 100 is adapted to turn in a housing 101. An oil inlet port 102 may be connected to the pressure line of the operating fluid. Another port 103 at the opposite side forms the outlet. The outlet pipe 104 has a discharge vent 105 through which the pumped gases are discharged. In the embodiment shown in Fig. 1 it would lead into line 10. The discharge port 106 (illustrated in Fig. 7) communicates through a pipe 107 with said vent. The suction port 108 would be in communication with line 8 of Fig. 1.

The vanes 99 are curved so that reaction of the deflected fluid causes rotation of the runner.

To produce a high vacuum, it is necessary that the velocity of the fluid entering the converter be high. While any source of flowing fluid may be used, it may be supplied by a centrifugal pump causing an oil circulation.

The operation is illustrated in Fig. 7. The runner moves in the direction indicated by the arrow 109, while the motion of the circulating fluid is in the direction of the arrow 110. It is necessary that the vanes are close together and of sufficient length that the moving column of fluid has enough mass to continue and create cavities or voids.

Having thus described the essential parts of the refrigerating device, I shall now briefly describe its operation.

Suppose the engine turns about 1000 R. P. M. under load and the vacuum is not sufficient to close needle 18 entirely, then a partial vacuum is built up in line 8 and chamber 2. Due to the pressure difference air flows through passage 20 into chamber 2. The valve 24 is closed and 26 open. In the venturi 19, due to the high velocity a suction is created so that water is drawn from the bottom and sprayed into chamber 2, whereby part of it evaporates, and the vapor carried by the air is drawn out through line 8 into the pump and from there into the manifold, to be consumed by the engine. The air and vapor thus form the refrigerant. It cools first chamber 60, which is the coldest, then the water in the reservoir 1, and finally the air to be cleaned and reconditioned, as well as that which is admitted into chamber 2.

Supposing now engine speed and load have dropped and the vacuum in the manifold has risen, but that the pump is not producing any vacuum any more due to the low speed, then the pump is by-passed through line 13, check valves 11 and 14 being open. Otherwise the condition remains the same.

If the pump 9 operates at full capacity, and there is some suction in the manifold, the vacuum in the diaphragm housing 16 overcomes spring 21 and the venturi is closed. So is valve 26. Due to the high vacuum in chamber 2 water evaporates from the pump around the float and from wick 6. The dry steam thus generated is drawn into pump 9 and from there into the manifold.

It will be noted that the refrigerator works evenly at different engine speeds and does not attempt to overload the engine when idling because venturi 19 is then partly closed.

It is evident that pump 9 constructed as shown will produce a very high vacuum due to the elimination of residue around the impeller vanes, which in present day pump 3 with returning vanes has never been accomplished. It is therefore necessary in present-day procedure to use centrifugal turbo-compressors, which must turn at very high speeds and be built with many stages. However, a simple turbo-compressor connected to the manifold as shown in the system described will give very satisfactory results. Also an ordinary vane-type vacuum pump, in conjunction with the manifold may be used, though the vacuum is lower and the cooling temperature higher.

In the fuel evaporating system the diaphragm pump 29—whose principle of operation is already known because it is old—meters a certain amount of fuel proportional to engine speed, into the suction line 35. The air dome 49 dampens out the pulsations and makes operation more even. The fuel when emitting from the nozzle 50 in a fine spray partly turns into vapor because of the low pressure in line 52 carrying the heavy parts, of high boiling temperature, suspended as fine particles. By the evaporation heat is absorbed and reservoir 1 and passage 61 are thereby cooled. The turbo-compressor 53 is of the multi-stage type and works similar in operation to a supercharger. But for smaller engines a pump similar to pump 9 or any piston, diaphragm, or vane type pump may be used, in which case it may be driven by a common shaft with pump 9 and drive shaft 36. Thus pumps 9, 53, and 29 may be built in a single compact unit.

The fuel discharged from pump 53 is drawn into the carburetor where it is mixed with the incoming air to be consumed, together with the water vapors, by the engine. Since the vacuum in line 52 is higher than in line 54, some of the heavy fuel will condense, flowing by force of gravity into the small tube 55 where an additional suction force created by the venturi 56 draws it into the manifold. It is of importance that lines 54 and 49 are short and the vacuum in line 52 high to prevent sluggishness in operation due to the hold-over capacity of the lines. But since some retardation of fuel injection relative to the operation of the accelerator is inevitable, a retarding device consisting of the damper 48 is provided, so that the arrangement works similar to a choke. Supposing now the operator steps on the accelerator, pushing rod 39, thereby shifting the eccentric and increasing the magnitude of oscillation to deliver more fuel into line 49, and finally into the carburetor, the damper is adjusted so that the fuel injection into the carburetor takes place before the throttle has completed to open. Adjustment of this action may be accomplished by tightening or loosening spring 42, or by varying the orifice in the piston of the damper 48, which may be of any standard type of construction.

As far as the fuel lift pump 29 is concerned, the diaphragm type is preferred, because there is no wear to spoil adjustment. It is necessary that the check valves 33, 34 are of quick action, to allow accuracy in the metering of the fuel. The diaphragm itself must be stiff but elastic, preferably being constructed of a disc of spring steel. However, fuel metering pumps of the piston type have been made to operate satisfactorily, and there is no reason why this known type could not be used.

The refrigerator unit itself depends mainly on the purpose of its use. The embodiment shown would be typical for passenger buses, where drinking water and air-conditioning are required. In construction, it is desirable to place the coolest units or chambers in the middle of the refrigerator, and placing the passages for the incoming air around it. In this way losses due to radiation and conductance are reduced to a minimum.

It is apparent that since the invention is intended for use in conjunction with internal combustion engines, it may be applied in automotive vehicles, aircraft, or watercraft, as well as in conjunction with stationary engines. Therefore, I do not wish to be limited to the embodiment shown, but to modify within the scope of the invention. Thus it is apparent that in small passenger cars some of the refinements of the device would have to be sacrificed for low first cost, and in modifications of present day constructions where it is not desired to replace the carburetor, the fuel evaporating system would not be incorporated. In a very cheap construction, where for instance only the driver's seat is to be cooled, or for partial air-conditioning in a very small car, the fuel evaporating system and even the vacuum pump 9 may be dispensed with, relying on the manifold vacuum alone, whereby the venturi 19 may be held permanently open, obviating the diaphragm 16.

However, in very large installations, such as ocean liners or large multi-motored aircraft, certain refinements become necessary that are not shown on the diagram. For instance, certain control and indicating devices would be used, and pumps 9, 53, and 29 would be electrically driven. The water tank 1 would be connected to a regular permanent piping system for a continuous supply of water. In conjunction with a plurality of combustion engines, discharge pipe 10 would branch out to the several manifolds, or manifold 12 would lead to the different engines.

In a modification in Fig. 8 I show means to produce a vacuum in the shape of a reciprocating pump. A piston 111 slides in a cylinder 112 containing a liquid. A tapering orifice 113 of the kind described communicates with a reservoir 114. The suction line 8 leads to said cylinder through a check valve 115. The discharge line 10 leading to the manifold puts the entire device under manifold vacuum.

On the downward stroke of the piston a vacuum is created in cylinder chamber 112 because the fluid in 113 cannot follow fast enough. Vapor is drawn in from line 8, and on the upward stroke discharged through orifice 113 and line 10 into the manifold. In automobiles this device is mounted between the axle and body at 116 and 117, respectively, to cause reciprocation while driving. At the same time it functions as shock-absorber. Where this is not practical, as in airplanes, this device is operated by the engine in a conventional manner. In order to increase efficiency and to prevent oil leakage a pipe connection 118 is provided. The same principle may be applied to a vane type pump, or diaphragm.

The vacuum produced by this device may also be used for operation of brakes, especially with Diesel engines.

Having thus described my invention, I claim:

1. In combination with an internal combustion engine, a vacuum pump to vaporize water for cooling and to discharge the vapors formed to the intake manifold of said engine, a second vacuum pump to vaporize fuel for cooling, and to discharge the fuel vapor to the carburetor to be consumed by the engine, and means for metering said fuel.

2. In combination with an internal combustion engine, a vacuum pump whose discharge side is communicating with the intake manifold of said engine, a water reservoir, a vapor generator in communication with the intake side of said vacuum pump, means to convey water from said reservoir to said generator, means to control the amount of water in said generator, means to increase the surface of the water in said generator, means to allow air to expand into said generator, means to harness said expanding air to produce a water spray to further increase the area of the water in said generator to facilitate evaporation for the purpose of cooling.

3. The combination as claimed in claim 2, and means for varying and shutting off the air to the generator.

4. In combination with an internal combustion engine, an insulated housing, containing a water reservoir, a generator, a float valve in said generator to admit a certain amount of water from said reservoir, a porous material within said generator to increase the surface of said water, cooling coils communicating between said generator and a vacuum pump, said vacuum pump being outside of said housing and serving to create a low pressure in said generator to generate and carry away vapors from said generator to said internal combustion engine, a water drinking fountain supplied by said reservoir, a sump to receive the waste water from said fountain, an air cleaner, and means to convey air through said air cleaner past said cooling coils and sump for de-humidifying the cooling.

5. In combination with an internal combustion engine, a supply of water, a generator, means to feed water from said supply of water to said generator, pumping means to create a suction in said generator to cause evaporation of water for the purpose of cooling means, for admitting a certain amount of air into the generator when the suction is low, means for shutting off the admission of air into said generator when the suction is increased, and a discharge line from said pumping means to the intake manifold of said internal combustion engine to increase the suction produced by said pumping means.

6. In a refrigerating system in conjunction with an internal combustion engine, a reservoir, a supply of water in said reservoir, a vacuum pump to produce a suction to cause evaporation of said water, a discharge line from said vacuum pump to the intake manifold of said internal combustion engine, to feed the water vapors pumped by said vacuum pump to the internal combustion engine to be consumed thereby, and means to admit a small amount of air to said supply of water when the suction is insufficient to cause evaporation, substantially as described.

7. In a refrigerating system in conjunction with an internal combustion engine, a generator chamber to cause atomization of water, a supply of water in said generator chamber, a vacuum pump whose suction side communicates with said generator chamber to cause evaporation of water for cooling, a discharge line from said vacuum pump to the intake manifold of said internal combustion engine to feed the water vapors discharged from said vacuum pump to said internal combustion engine to be consumed thereby, means to admit a small amount of air into the generator chamber when the suction is low, means to utilize the air admitted to said generator chamber to produce a spray of water to increase surface evaporation, means to catch condensed water discharged from said vacuum pump, and means to return said condensed water to the generator chamber while air is admitted.

8. In a refrigerating system in conjunction with an internal combustion engine, a generator chamber, a vacuum pump whose intake side communicates with said generator chamber to cause evaporation of water for cooling, a discharge line from said vacuum pump to the intake manifold of said internal combustion engine to feed the water vapors discharged from said vacuum pump to said internal combustion engine to be consumed thereby, a supply of fuel, an evaporating chamber for said fuel, pumping means to pump a controllable amount of fuel into said evaporating chamber, means for atomizing the fuel while discharged into said evaporating chamber, a suction pump communicating with said evaporating chamber to evaporate said atomized fuel by low pressure for cooling, a discharge line from said suction pump for fuel to the intake manifold of said internal combustion engine to feed the fuel vapor discharged by said pump to said engine to be consumed thereby.

9. In a refrigerating system in conjunction with an internal combustion engine, an evaporating chamber to produce cooling, a supply of fuel, a pump to feed fuel from said supply of fuel to said evaporating chamber, means for atomizing the fuel discharged into said evaporating chamber, means to control the amount of fuel discharged by said pump, and a vacuum pump to evaporate the atomized fuel in said evaporating chamber, the discharge side of said vacuum pump being in communication with the intake manifold of said internal combustion engine to discharge the fuel vapors to the engine to be consumed thereby after being properly mixed with air.

10. The combination as claimed in claim 9, where said means to control the amount of fuel discharged by said metering pump, is interlocked with the engine throttle, and where means are provided that for quick acceleration the discharge of the metering pump is increased before the throttle opens.

11. The combination as claimed in claim 9, where condensed fuel discharged from the vacuum pump is atomized in a venturi to be absorbed by the intake gases of the engine.

12. In conjunction with an internal combustion engine, a cooler, a supply of water, a generator to receive water for evaporation, a vacuum pump, a communication between said vacuum pump and said generator, said vacuum pump being adapted to create a high degree of vacuum to cause evaporation of water in said generator for cooling, a discharge line from said vacuum pump to the intake manifold of said internal combustion engine to feed the water vapors to said engine to be consumed thereby, a supply of fuel, an evaporating chamber, controllable means for feeding said fuel to said evaporating chamber, a suction pump to evaporate the fuel in said evaporating chamber to produce cooling, a discharge line from said suction pump for evaporating fuel leading to the intake manifold of said internal combustion engine, means for mixing air with the discharged fuel gases, means for controlling the amount of air relative to the amount of fuel metered into said evaporating chamber, a communication controlled by a valve between said described fuel evaporating chamber and said generator, so that by shutting off said vacuum pump for evaporating water, and opening said valve, air and water vapor can be admixed to the fuel vapor and discharged to the engine by said suction pump for fuel.

13. The construction as claimed in claim 4, and means to controllably force the de-humidified cooled air through the seats, substantially as described.

BERTELI STELZER.